(12) United States Patent
Eyer

(10) Patent No.: US 8,099,752 B2
(45) Date of Patent: Jan. 17, 2012

(54) NON-REAL TIME SERVICES

(75) Inventor: Mark Kenneth Eyer, Woodinville, WA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 338 days.

(21) Appl. No.: 12/584,171

(22) Filed: Sep. 1, 2009

(65) Prior Publication Data

US 2010/0134701 A1    Jun. 3, 2010

Related U.S. Application Data

(60) Provisional application No. 61/200,767, filed on Dec. 3, 2008, provisional application No. 61/200,981, filed on Dec. 5, 2008, provisional application No. 61/206,049, filed on Jan. 26, 2009, provisional application No. 61/161,941, filed on Mar. 20, 2009.

(51) Int. Cl.
*H04N 5/445* (2006.01)
*G06F 13/00* (2006.01)
*G06F 3/00* (2006.01)

(52) U.S. Cl. .................. 725/48; 725/40; 725/51

(58) Field of Classification Search ............. 725/39, 725/40, 48, 51
See application file for complete search history.

(56) References Cited

OTHER PUBLICATIONS

"Implementing the ATSC PSIP Standard," Paul Freeman, Softprose Inc., Oct. 26, 2006.
"TiVo Series3 HD DVR (32-HD hours) Product Summary," CNET Editors' review Sep. 11, 2006 (updated on Sep. 4, 2008).

*Primary Examiner* — Hunter Lonsberry
(74) *Attorney, Agent, or Firm* — Miller Patent Services; Jerry A. Miller

(57) ABSTRACT

In certain embodiments, a digital television receiver that receives non-real time (NRT) content has an IP demultiplex or a radio frequency tuner that receives a transport stream. The output transport stream contains an IP packet stream containing NRT content, a FLUTE file description table (FDT) and NRT metadata. An electronic storage medium is provided and a demultiplexer demultiplexes the IP stream of packets to produce: NRT content that is stored in the electronic storage medium, the FLUTE FDT, and NRT metadata. An FDT parser parses the FDT to produce NRT file metadata from the FLUTE FDT. An NRT metadata parser produces NRT service metadata, NRT content description text and NRT content metadata. This abstract is not to be considered limiting, since other embodiments may deviate from the features described in this abstract.

28 Claims, 4 Drawing Sheets

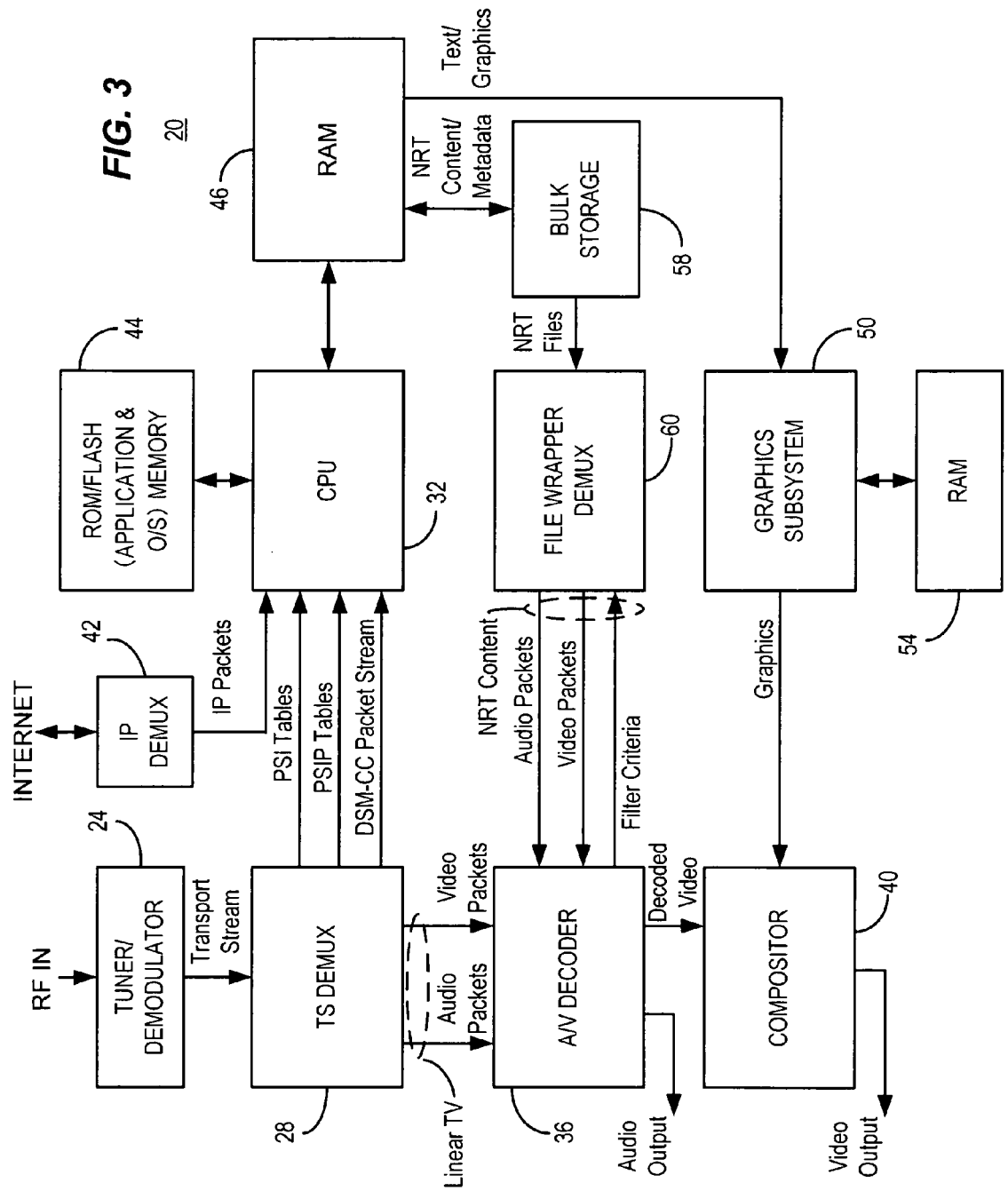

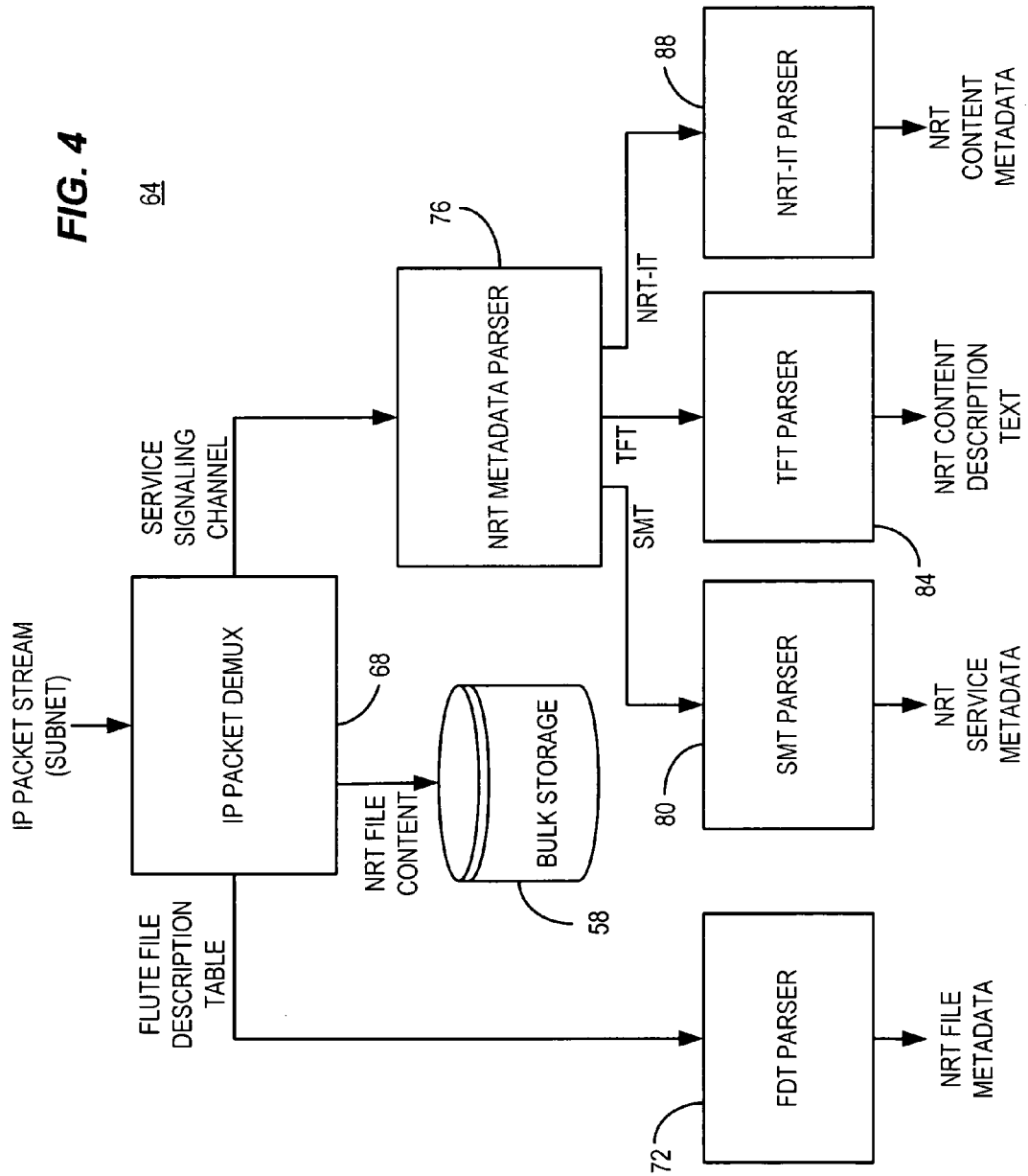

NON-REAL TIME SERVICES

CROSS REFERENCE TO RELATED DOCUMENTS

This application is related to and claims priority benefit of U.S. Provisional Patent Applications 61/200,767 filed Dec. 3, 2008, 61/200,981 filed Dec. 5, 2008, 61/206,049 filed Jan. 26, 2009 and 61/161,941 filed Mar. 20, 2009, all to Mark Eyer, and each of which is hereby incorporated herein by reference. Mark Eyer is also the author of a text entitled "PSIP: Program & System Information Protocol", 2003, The McGraw Hill Companies, Inc. and terms, acronyms, etc. relating to PSIP and associated technologies used herein are consistent with their use in this text. The APPENDIX hereto forms a part of this specification and is hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Embodiments consistent with this invention pertain to non-real-time (NRT) video services for Advanced Television Systems Committee (ATSC) compliant digital terrestrial broadcasting. An NRT video service is one in which the audio/video content is streamed from the broadcaster to receiving devices at a slower rate or a faster rate (or a combination thereof) than real-time rate. Receiving devices utilize local storage to capture the streaming files so they can be made available to viewers upon arrival of a complete file, or playback can begin prior to complete download of the entire file. NRT video services are presently available in a number of forms. For example, TiVo™ supports these today on the TiVo HD and TiVo Series 3 Personal Video Recorders using proprietary technology using the Internet as a distribution channel. However, there currently exists no standard way to implement these services for ATSC terrestrial broadcasts for playback on fixed television installations where Internet access is not available. Furthermore, the metadata associated with NRT services, including lists of available content and their descriptions would need to accompany the terrestrial broadcast even if the Internet could be used by the receiver to actually retrieve the files.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 3 is an example block diagram of a digital television receiver with NRT reception capabilities consistent with certain embodiments of the present invention.

FIG. 4 is an example diagram of the table parsing used in a manner consistent with certain embodiments of the present invention.

DETAILED DESCRIPTION

Figure 1:
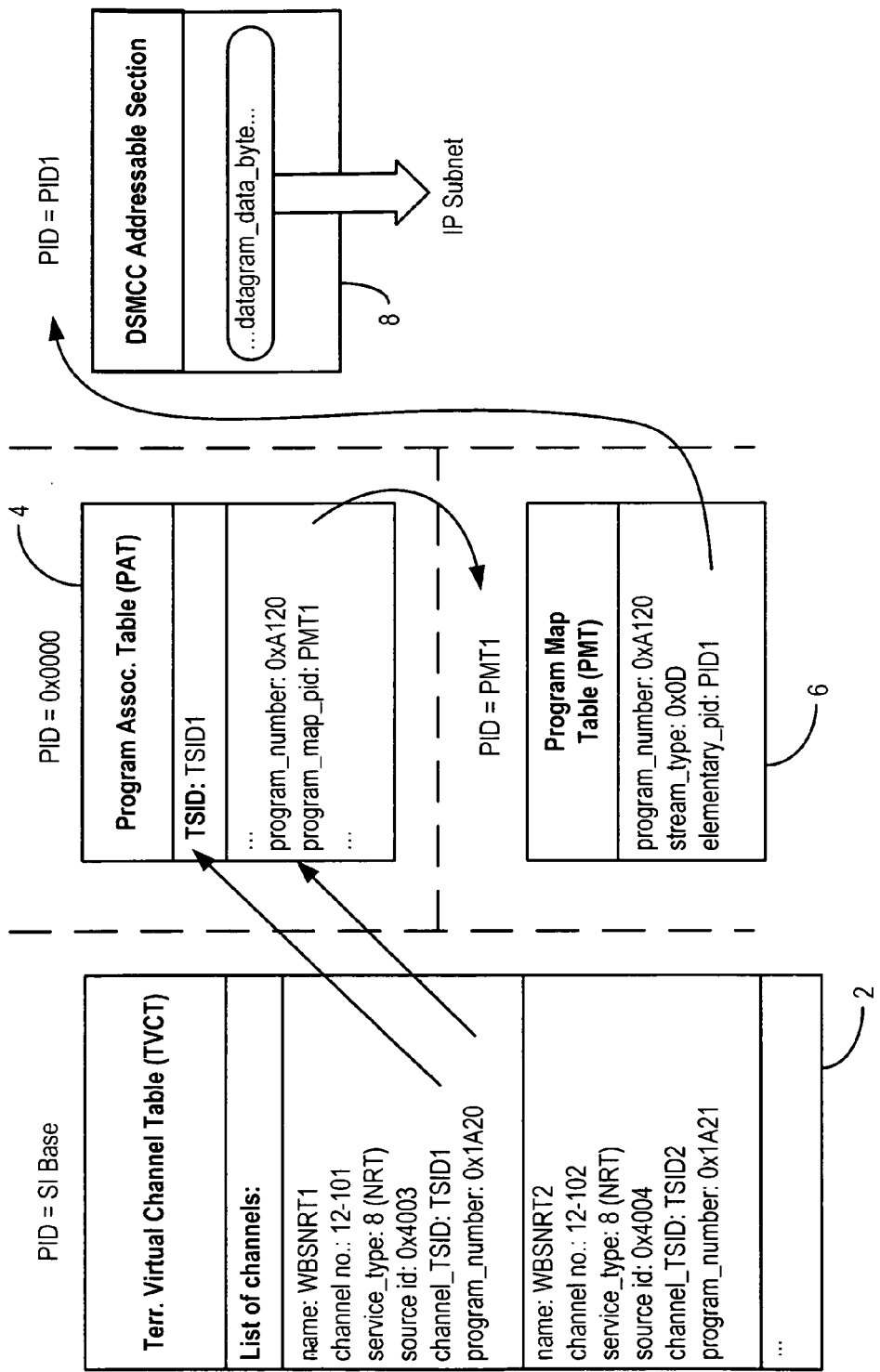
FIG. 1, is a diagram depicting delivery of IP packets via broadcast TV in a manner consistent with certain embodiments of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open ended language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive. Other terms used herein are consistent with their use in ATSC specifications and/or the above-referenced text by Mark Eyer unless otherwise defined or modified herein.

As previously noted, an NRT video service is one in which the audio/video content is streamed from the broadcaster to receiving devices at a slower rate or a faster rate (or a combination thereof) than real-time rate. Such services do not currently exist in a standardized format. Receiving devices utilize local storage to capture the streaming files so they can be made available to viewers upon arrival.

ATSC compliant digital television (DTV) broadcasts deliver 19.39 Mbps. transport streams which generally are not fully utilized every moment of the day. The excess capacity in these transport streams could be utilized for transporting NRT services. In some cases, the data may be sent in large bursts that are faster than real time, while in other instances, the data may be sent in smaller bursts or streams that are slower than real time. In either event, the content can be buffered to bulk storage in receivers for later presentation to a consumer. Generally, the present discussion enables the delivery and consumption of various types of NRT content. Some usage/consumption models that are envisioned include but are not limited to:

Browse and Download—the user is offered a list of content titles available for download; he or she may browse through these and select content items of interest. The files are automatically fetched when available by the receiver and stored for the user to view at a later time.

Push—a user subscribes to a "push" service which captures certain content that is generally frequently updated (e.g., stock prices, weather reports, sports scores, etc.). The receiver automatically fetches updates of the information; the service appears to "push" the updated information to the user.

Portal—a TV channel appears in the form of a web site that can be navigated by the user. Links on the TV channel generally lead to locally stored content that is either in random access memory (RAM) or persistent bulk storage.

In certain embodiments, a new ATSC Service Type for "NRT" is defined. The use of a new Service Type allows NRT services to be introduced into the digital broadcast television system in such a way that legacy receivers are unaffected— they disregard virtual channels with unknown Service Type values. While the Terrestrial Virtual Channel Table defines the service to be, in general, "Non-Real-Time," the specific usage/consumption model for the NRT files is given in the Service Category field in the Service Map Table (SMT). In the future, more complex features and capabilities could be enabled by NRT methods, like targeted advertising, downloaded games, and the like. These services, if they were to be offered, would preferably employ different values of Service Category.

FIG. 1 depicts one mechanism through which broadcast television is utilized to implement IP multicast over an ATSC delivery transport in accord with ATSC standard A/92. In this figure, a Terrestrial Virtual Channel Table (TVCT per ATSC A/65) 2 provides information regarding each channel and includes a service type identifier of 8 (in this example) that defines the service as a NRT service that is delivered via IP packets. This table further provides TSID information and a program number that points to information in a Program Association Table (PAT) 4, which in turn points to a program map table (PMT) 6 via a program map PID (Packet Identifier). The PID is used to associate with a Digital Storage Media Command and Control (DSMCC) table 8 which essentially equates the content associated with the PID to an IP subnet to identify a data stream corresponding to the NRT data sought.

In accord with certain implementations consistent with the present invention, a standard method is provided to define a new table which is referred to herein as the NRT-IT (NRT Information Table). The NRT-IT table has unique structure and function which facilitates its use in organizing the metadata it conveys.

In addition, the NRT-IT table introduces several other novel metadata items relevant to the non-real-time application:

a parameter called Playback Delay, which indicates the amount of time from the recovery of the first byte of the file the receiver must wait prior to beginning playback of the content;

a method to indicate that a given piece of NRT content is available also via Internet transport, and an indication of the Uniform Resource Locator (URL) that can be used to retrieve it;

a flag indicating whether or not the NRT file can be extracted from the broadcast stream with low-latency (while the user waits), or whether the receiver should prompt the user to return to view it at a later time (long latency). This latency may be established according to a threshold that separates longer from lower and may be determined by the broadcaster; and a method to identify an graphical icon representation of the NRT service or content item.

NRT content within the broadcast stream may be delivered in a discontinuous, non-uniform way, such that the rate of packets may be variable over time. A long movie file, for example, may be delivered at 50% of real-time speed for the first half of the file, and one-quarter real-time for the remainder. In this case, if a receiver were to extrapolate and guess that playback could commence when half the file had been buffered, playback would be interrupted because the slower rate in the second portion would cause buffer under-run. The Playback Delay parameter allows the receiver to avoid guessing by letting the broadcaster indicate when playback may safely start without causing the buffer to become empty during playback (assuming fast-forwarding does not occur).

In some prior NRT implementations (such as OMA BCAST—Open Mobile Alliance Broadcast), a Uniform Resource Indicator (URI) was associated with NRT content items, but receivers could not determine whether a given URI was also a URL (such that the content was also being made available via a server on the Internet). In a preferred embodiment of the present invention, the NRT-IT may associate a URL with content items that optionally may be retrieved by the Internet.

A data structure is defined which is referred to herein as a Internet Location Descriptor (ILD), which can be associated with one or more files carried in the broadcast multiplex to point to content that may be retrieved via the Internet, for the benefit of receivers that have Internet access. The ILD may appear in the NRT-IT, where it indicates the physical location of the file or files comprising the particular item of content available for download. The ILD may also be used within the PSIP Virtual Channel Table. In this location, the ILD points to multimedia content descriptive of the channel itself. Such content could include channel logo, HTML-formatted pages, etc.

This approach provides an efficient method to represent and transport the metadata used to describe NRT video services in a way that is compatible and complementary to existing practice in ATSC DTV transmission standards.

In the preferred embodiment of the present invention, a method originally defined for Internet Protocol (IP) transport over the Internet called "FLUTE" is employed. FLUTE, or "file delivery over unidirectional transport" is specified in RFC-3926. FLUTE builds on another IP-based transport method called Asynchronous Layered Coding, a base protocol that was designed for efficient distribution via IP-multicast methods. FLUTE defines a File Delivery Table (FDT) containing characteristics of one or more files contained in a "session." The files delivered in a FLUTE session may be considered to be carried in a "carousel," as the sequence of bytes comprising each file typically repeat cyclically.

As defined herein, the NRT-IT table has several attributes that distinguish it from an ATSC Data Event Table (DET) which is used in delivery of multicast sessions for ATSC Broadcasts. By way of example, some of the differences are:

NRT-IT gives first and last availability times for the content, where the DET gives "start time" and "length," highlighting the fact that in the DET only real-time monitoring and use of the data stream was contemplated.

NRT-IT gives playback time for stored content (the amount of time it takes to play the complete file); this concept does not appear in any of the ATSC data broadcast standards.

NRT-IT provides (via associated Internet Location Descriptor—(previously referred to as Content Location Descriptor in one or more of the above provisional applications)) the location of one or more audio/video or other content files within a transmitted FLUTE session.

NRT-IT provides the storage requirements for downloaded content; DET does not.

The structure (syntax and semantics) of the NRT-IT is described below. This structure includes:

a) Extensions to existing methods for announcement of linear broadcast television programming services to support non-real-time delivery. Existing methods are based on the use of ATSC A/65 PSIP. The extension defined here involves definition of one new table, the NRT-IT (Non-Real Time Information Table), and definition of new ATSC "Service Types."
b) The existing standard ATSC descriptor mechanism is utilized, and already standardized ATSC descriptors including the Caption Services Descriptor, Content Advisory Descriptor, Genre Descriptor, and ATSC and ISO Content Identifier Descriptor are retained.
c) With the use of Content Identifier Descriptors in both the NRT-IT and EIT, a user can easily search for NRT content associated with any given live (real time) event advertised in the EIT. Using this method, past episodes of the show currently being watched can be scheduled for NRT download.

As mentioned, each defined Virtual Channel is associated with a Service Type. Typical Service Types are "ATSC Digital Television," "Audio-Only Service," and "Software Download." The definition of the NRT Service Type embodies:
a. The fact that the Virtual Channel is a gateway to one or more NRT services, in which the user is offered a number of content items available for immediate or later download.
b. Each content item is described by a content title, a descriptive sentence or paragraph, and other metadata (such as content advisory, the availability of closed captioning, optionally a JPEG image for on-screen representation of the content item, etc.).
c. A defined set of audio/video codecs, transport encodings and bindings; if the receiver supports this set, all NRT content associated with this service will be renderable.
d. Each Virtual Channel of Service Type "NRT" has a pointer to a set of entries in a Service Map Table (SMT). Each NRT service in the SMT is associated with entries in an NRT Information Table (NRT-IT), each instance of which describes a set of content items the broadcaster has scheduled to be available for download.

The definition of the syntax and semantics of the NRT-IT can take many forms, but in one example, the syntax and semantics are provided in the APPENDIX hereto. The APPENDIX, at several locations, uses the term TBD to mean To Be Determined. TBD values are a matter of choice which can be readily made by one skilled in the art upon consideration of the present teachings to provide standardization and can be selected to avoid conflicts.

Figure 2:
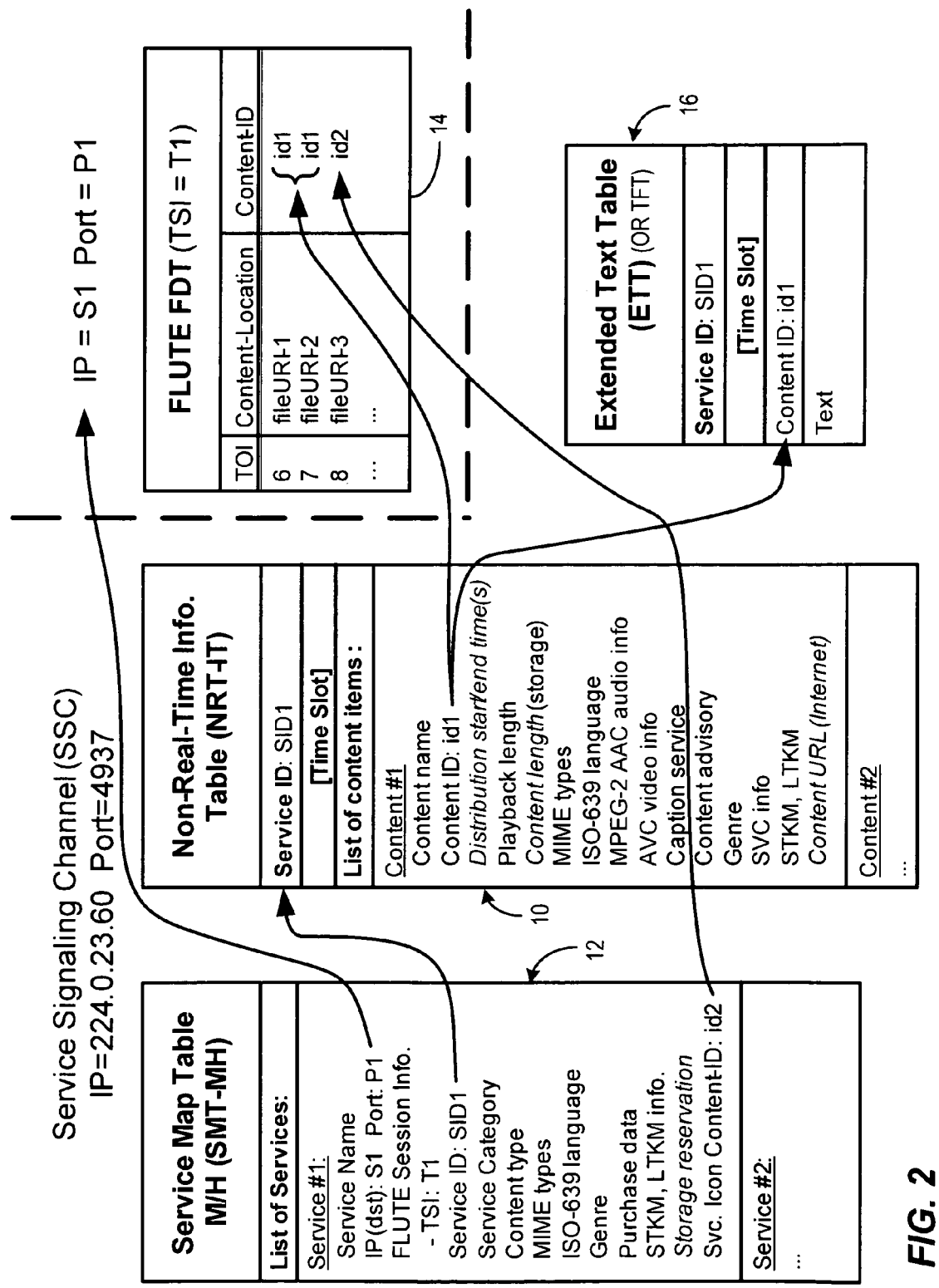
FIG. 2 is a diagram depicting an example NRT Information Table and its interaction with other tables in a manner consistent with certain embodiments of the present invention.

Turning now to FIG. 2, an example NRT-IT is depicted as 10. The NRT-IT is linked to the SMT-MH table 12 by the service ID (e.g., SID 1). The SMT-MH table 12 is linked to a FLUTE File Delivery Table (FDT) 14 via the destination IP address and port number and Transport Session Indicator (TSI) value. Content identifier fields in the NRT-IT 10 reference files in the FLUTE FDT 14. One content identifier reference in the NRT-IT may reference one or more files in the FDT. A different content identifier, in the SMT 12, may be present to reference a file in the FDT containing a graphical icon that can be used to represent the service.

The FLUTE FDT is an IP packet-based directory of files that includes a content identifier that identifies content present in IP packets elsewhere in the IP packet stream. The content identifier also may link to an analogous field in a Text Fragment Table TFT 16 (formerly referred to as the extended text table in one or more of the above provisional applications) that provides textual metadata associated with the content. Thus, the files that represent NRT content and associated metadata is packaged as IP packets that are embedded within the broadcaster's data, for example, as a stream that is encapsulated within the 188-byte MPEG-2 Transport Stream (TS) packets most commonly used for television broadcasts.

In conventional PSIP, various service types are defined in the virtual channel table. For example, DTV signals are service type 2 and software downloads are defined as service type 5. In accord with embodiments consistent with the present invention, an NRT service type is defined as a new service type (e.g., service type 8). Hence, when the virtual channel table indicates that a service type 8 is present, the receiver can expect and look for receipt of an NRT-IT. The NRT-IT therefore defines the various parameters that might be used or needed to process and present the NRT content and the associated metadata to the viewer. It is noted that one service ID in the SMT can point to multiple items of NRT content which have varying parameters. The content information in the NRT-IT can define more stringent requirements to consume the content than that generally defined in the SMT. By way of example, the SMT may specify the support of a particular codec is required in the receiver to offer a meaningful presentation of the service, but the content definition in the NRT-IT may specify a codec with different and more stringent requirements.

The NRT-IT may contain multiple table elements including, but not limited to, content name, content ID, Distribution start/end times, playback length, content length (in terms of storage required), content types (codecs), language or languages, audio information, video information, caption service information, content advisories, genre, service information, optional encryption keys, and may contain a content URL where the content can be immediately retrieved rather than awaiting the next instance of a broadcast. The attached APPENDIX provides a detailed example of an implementation specification for implementing the NRT Information Table and defines its associated elements. This should form a part of a system specification for NRT services such as an NRT specification as is at the time of this writing being drafted by the ATSC.

FIG. 3 depicts a simplified TV receiver system 20 that is devised to receive both real time television broadcasts and NRT content. In this system a modulated RF input signal is received, tuned and demodulated at a tuner 24 to produce an ATSC output transport stream (as modified by incorporation of the NRT content as described herein). The transport stream is conventionally a bit stream flowing at a rate of 19.39 Mbps that may carry a plurality of channels of content including NRT content in 188-byte MPEG-2 compliant Transport Stream packets. This Transport Stream is demultiplexed at the demultiplexer 28 to produce program-specific information (PSI) tables (per ISO/IEC 13818-1) and PSIP tables (per ATSC A/65 PSIP) and a DSM-CC packet stream to CPU 32. For the case of conventional real time (linear) TV content, audio and video packets are supplied to an A/V decoder 36 for decoding. The decoded audio is supplied to an audio subsystem (not shown) that reproduces the audio and the video is supplied to a compositor 40 which supplies the video output to the TV's video display circuits (also not shown).

In the alternative, content can be received as a stream of IP packets from the Internet at an IP demultiplexer 42 such that they are passed directly to CPU 32 for processing.

Depending upon the mode of operation of the display, the CPU 32, which operates in conjunction with application and operating system memory in ROM or Flash memory 44, and RAM 46 for example to supply text or graphics (e.g., as in a graphical user interface [GUI]) as generated by a graphics subsystem 50 that operates using graphics memory RAM 54 to produce graphics as overlays or the like to compositor 40. Compositor 40 combines the graphics if present with the decoded video as its video output.

For NRT files and metadata received in the transport stream, this data is routed via the CPU to RAM 46 and the content and metadata can be stored to bulk storage such as a disc drive 58. When the CPU 32 instructs the system to play a selection of NRT content, the NRT files are demultiplexed from their file wrapper (e.g., an MP4 A/V wrapper) at 60 to provide audio and video packets established according to a filter criteria to the A/V decoder 36 for ultimate presentation to the consumer.

Referring to 64 of FIG. 4, in order to provide the functionality for access, download and playback of the NRT data and content, processor 32 the IP packets received via the transport stream for support of NRT content is demultiplexed in an IP packet demultiplexing operation 68 to first separate the stream into the FLUTE file description table, the NRT file content and service and signaling information. The NRT file content is stored to the bulk storage 58 and the FLUTE file description table is processed by a FLUTE description table parser 72 to produce NRT file metadata. The service signaling channel data is processed by an NRT data parser 76 that separates the NRT metadata into 1) service map table (SMT) data that is parsed at a SMT parser 80 to produce NRT service metadata; 2) text fragment table data (TFT) that is parsed at TFT parser 84 into NRT content descriptive text; and 3) NRT-IT data that is parsed at NRT-IT parser 88 into NRT content metadata. The output of parsers 72, 80, 84 and 88 can be stored either in local RAM or Flash memory or bulk storage 58 or any combination thereof (or using any other storage mechanism). Generally, bulk storage is reserved for larger files or for additional storage when other memory is at a premium.

Many variations of the above will occur to those skilled in the art upon consideration of the present teachings. The application used by a receiver is easily devised upon consideration of the present teachings, and can be implemented in a wide variety of ways, allowing manufacturers great latitude in product differentiation while providing for NRT services consistent with a standard delivery arrangement.

Thus, in certain embodiments, a digital television receiver that receives non-real time (NRT) content has an IP demultiplexer (Demux) or a radio frequency tuner that receives a transport stream. The output transport stream contains an IP packet stream containing NRT content, a FLUTE file description table (FDT) and NRT metadata. An electronic storage medium is provided and a demultiplexer demultiplexes the IP stream of packets to produce: NRT content that is stored in the electronic storage medium, the FLUTE FDT, and NRT metadata. An FDT parser parses the FDT to produce NRT file metadata from the FLUTE FDT. An NRT metadata parser produces NRT service metadata, NRT content description text and NRT content metadata.

In certain implementations, a digital television receiver that receives non-real time (NRT) content has a radio frequency tuner that receives a radio frequency modulated channel containing a transport stream over a tuned channel and demodulates the channel to produce an output transport stream. The output transport stream contains an Internet Protocol (IP) stream of packets containing non-real time content, a FLUTE file description table (FDT) and NRT metadata. An electronic storage medium is provided. A demultiplexer demultiplexes the IP stream of packets to produce: NRT content that is stored in the electronic storage medium, the FLUTE FDT, and NRT metadata. An FDT parser parses the FDT to produce NRT file metadata from the FLUTE FDT. An NRT metadata parser produces NRT service metadata; NRT content description text and NRT content metadata.

In certain implementations, a service signaling channel contains the NRT metadata. In certain implementations, the NRT service metadata is received in a Service Map Table. In certain implementations, the NRT content description text is received in a Text Fragment Table (TFT). In certain implementations, the NRT content metadata is stored in an NRT information table (NRT-IT). In certain implementations, the output transport stream further comprises a virtual channel table (VCT), and wherein the VCT contains a service type code indicative of a virtual channel corresponding to NRT content. In certain implementations, the NRT service metadata is stored in a Service Map Table (SMT), the NRT content description text is stored in a Text Fragment Table (TFT), the NRT content metadata is stored in an NRT information table (NRT-IT), and wherein the output transport stream further comprises a virtual channel table (VCT), and wherein the VCT contains a service type code indicative of a virtual channel corresponding to NRT content. In certain implementations, the SMT signals an IP destination address and Port number that points to the FLUTE FDT, and wherein the SMT has a service ID (SID) that indexes a table entry pointing at a matching service ID in the NRT-IT. In certain implementations, the NRT-IT table has a content ID that indexes table entries in the FLUTE FDT. In certain implementations, the NRT-IT table further includes entries in the TFT. In certain implementations, the NRT-IT table includes a Playback Delay parameter that indicates an amount of time from the recovery of the first byte of the file the receiver should wait prior to beginning playback of the content. In certain implementations, the NRT-IT table includes a flag indicating whether or not the NRT file can be extracted from the broadcast stream with lower-latency or whether the receiver should prompt the user to return to view it at a later time due to longer latency, wherein lower and longer are measured with respect to one another. In certain implementations, the NRT-IT table points to a table that points to a graphical icon representation of the NRT service or content item. In certain implementations, the NRT service metadata is stored in a Service Map Table. In certain implementations, the NRT content description text is stored in a Text Fragment Table (TFT). In certain implementations, the content metadata comprises an indication that the identified content may be retrieved from an Internet-based server, and a Uniform Reference Locator (URL) that may be used to effect said retrieval.

In another implementation, a digital television receiver that receives non-real time (NRT) content has an Internet protocol (IP) receiver that receives a stream of IP packets and selects an IP subnet containing a packet stream selected as an output packet stream. The output packet stream contains non-real time content, a FLUTE file description table (FDT) and NRT metadata. An electronic storage medium is provided. A demultiplexer demultiplexes the IP packet stream to produce: NRT content that is stored in the electronic storage medium, the FLUTE FDT, and NRT metadata. An FDT parser parses the FDT to produce NRT file metadata from the FLUTE FDT. An NRT metadata parser produces NRT service metadata and NRT content metadata.

In certain implementations, a Service Signaling Channel (SSC) contains the NRT metadata. In certain implementations, the NRT service metadata is received in a Service Map Table. In certain implementations, the NRT content description text is received in a Text Fragment Table (TFT). In certain implementations, the NRT content metadata is received in an NRT information table (NRT-IT). In certain implementations, the output transport stream further comprises a virtual channel table (VCT), and wherein the VCT contains a service type code indicative of a virtual channel corresponding to NRT content. In certain implementations, the NRT service metadata is received in a Service Map Table (SMT), the NRT content description text is received in a Text Fragment Table (TFT), the NRT content metadata is received in an NRT information table (NRT-IT), and wherein the output transport stream further comprises a virtual channel table (VCT), and wherein the VCT contains a service type code indicative of a virtual channel corresponding to NRT content. In certain implementations, the SMT has an IP destination address and Port number that points to the FLUTE FDT, and wherein the SMT has a service ID (SID) that indexes a table entry pointing at a service ID in the NRT-IT. In certain implementations, the NRT-IT table has a content ID that indexes table entries in the FLUTE FDT. In certain implementations, the NRT-IT table has a content ID that indexes table entries in the FLUTE FDT. In certain implementations, the NRT-IT table further includes entries in the TFT. In certain implementations, the NRT-IT table includes a Playback Delay parameter that indicates an amount of time from the recovery of the first byte of the file the receiver should wait prior to beginning playback of the content. In certain implementations, the NRT-IT table includes a flag indicating whether or not the NRT file can be extracted from the broadcast stream with lower-latency or whether the receiver should prompt the user to return to view it at a later time due to longer latency, wherein lower and longer are measured with respect to one another. In certain implementations, the NRT-IT table points to a table that points to a graphical icon representation of the NRT service or content item. In certain implementations, the NRT service metadata is stored in a Service Map Table. In certain implementations, the NRT content description text is stored in a Text Fragment Table (TFT). In certain implementations, the content metadata comprises an indication that the identified content may be retrieved from an Internet-based server, and a Uniform Reference Locator (URL) that may be used to effect said retrieval.

Another digital television receiver that receives non-real time (NRT) content has a receiver device that receives a signal and produces an output transport stream, the output transport stream containing an Internet Protocol (IP) stream of packets containing non-real time content, a FLUTE file description table (FDT) and NRT metadata. An electronic storage medium is provided. A demultiplexer demultiplexes the IP stream of packets to produce: NRT content that is stored in the electronic storage medium, the FLUTE FDT, and NRT metadata. An FDT parser parses the FDT to produce NRT file metadata from the FLUTE FDT. An NRT metadata parser produces NRT service metadata; NRT content description text and NRT Content Metadata.

Those skilled in the art will recognize, upon consideration of the above teachings, that certain exemplary embodiments may be based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will also appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

While certain illustrative embodiments have been described, it is evident that many alternatives, modifications, permutations and variations will become apparent to those skilled in the art in light of the foregoing description.

APPENDIX

Sample Specification Format 1.1 Non-Real-Time Information Table (NRT-IT)
The Non-Real-Time Information Table (NRT-IT) contains information describing content available for download to storage in the receiving device. The information provided in the NRT-IT includes the title of the content (for example, the name of the program available for download), the times during which the content is to be made available for download, and information such as content advisories, availability of caption services, content identification, and other metadata.

One item of content may consist of one or more files. For example, an audio/video clip may come with a JPEG thumbnail image that can be used to represent it in on-screen displays.

The NRT-IT shall be used to provide information for virtual channels of service_type values 0x08 defined above.

Unlike the EIT in which each instance corresponds to a 3-hour time slot, an instance of the NRT-IT can include data corresponding to an arbitrarily defined time period, or can describe NRT content starting at a specified time and into the indefinite future. Each NRT-IT instance indicates the start time of the period it covers and the length of the period it covers (which may be indefinite).

Each NRT-IT instance may be segmented into as many as 256 sections. One section may contain information for multiple content items, but the information for any given content item shall not be segmented and put into two or more sections.

Any content item to be made available for download for a time interval that extends beyond the time period covered one or more NRT-IT instances shall be described only in the first of these NRT-ITs.

Content item descriptions shall be placed within the NRT_information_table_section( ) in the order of their first availability. Therefore, when last_section_number is greater than zero (meaning the NRT-IT is delivered in multiple sections), for sections other than the first (sections for which the value of section_number is greater than zero), all the content item descriptions within a given section shall have first availability times that are greater than or equal to all first availability times of content item descriptions in the immediately preceding section (the section whose value of section_number is one lower than the given section). The contents of the fields and the descriptors in each events descriptor loop shall be accurate representations of the known information about each content item at the time the content item instance is created and shall be updated if more accurate information becomes available.

The Non-Real-Time Information Table is carried in table sections with table_id 0xTBD. The following constraints apply to the IP packets carrying the NRT-IT sections:

The destination IP address shall be the ATSC Service Signaling Channel, 224.0.23.60. The port number shall be 4937.

The following constraints shall apply to the NRT-IT:

Each NRT-IT shall identify NRT services associated with the given value of service_id available on a particular virtual channel sometime during the time period it covers.

The NRT_information_table_section( ) is modeled after the MH_service_signaling_table_section( ) defined in A/153 Part 3, Sec. 7.1. Unless otherwise defined below, identically-named fields in the NRT_information_table_section( ) shall be as defined as in the MH_service_signaling_table_section( ) in A/153 Part 3, Sec. 7.1. The bit stream syntax for the Non-Real-Time Information Table shall be as shown in Table 1.

TABLE 1

Bit Stream Syntax for the Non-Real-Time Information Table

| Syntax | No. Bits | Format |
|---|---|---|
| NRT_information_table_section( ) { | | |
|   table_id | 8 | 0xTBD |
|   section_syntax_indicator | 1 | '1' |
|   private_indicator | 1 | '1' |
|   Reserved | 2 | '11' |
|   section_length | 12 | uimsbf |
|   service_id | 16 | uimsbf |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   time_span_start | 32 | uimsbf |

TABLE 1-continued

Bit Stream Syntax for the Non-Real-Time Information Table

| Syntax | No. Bits | Format |
|---|---|---|
|   reserved | 5 | '11111' |
|   time_span_length | 11 | uimsbf |
|   num_items_in_section | 8 | uimsbf |
|   for (j=0; j< num_items_in_section; j++) { | | |
|     content_id | 16 | uimsbf |
|     updates_available | 1 | bslbf |
|     TF_available | 1 | bslbf |
|     low_latency | 1 | bslbf |
|     content_length_included | 1 | bslbf |
|     playback_length_in_seconds | 20 | uimsbf |
|     if (content_length_included==1) { | | |
|       content_length | 40 | uimsbf |
|     } | | |
|     playback_delay_included | 1 | bslbf |
|     expiration_included | 1 | bslbf |
|     reserved | 2 | '11' |
|     duration | 12 | uimsbf |
|     if (playback_delay_included==1) { | | |
|       reserved | 4 | '1111' |
|       playback_delay | 20 | uimsbf |
|     } | | |
|     if (expiration_included==1) { | | |
|       expiration | 32 | uimsbf |
|     } | | |
|     content_name_length | 8 | uimsbf |
|     content_name_text( ) | var | |
|     reserved | 4 | '1111' |
|     content_descriptors_length | 12 | Uimsbf |
|     for (i=0; i<N; i++) { | | |
|       content_descriptor( ) | | |
|     } | | |
|   } | | |
|   reserved | 6 | '111111' |
|   descriptors_length | 10 | Uimsbf |
|   for (i=0; i<M; i++) { | | |
|     descriptor( ) | | |
|   } | | |
| } | | | table_id—This 8-bit field shall be set to 0xTBD to identify this table section as belonging to the Non-Real-Time Information Table.

service_id—This 16-bit field shall specify the service_id associated with the NRT service offering content items described in this section.

NRT_IT_version_number—This 5-bit field shall indicate the version number of this NRT-IT instance, where NRT-IT instance is defined as the set of one or more NRT_information_table_section( ) having common values for service_id, current_next_indicator, protocol_version, and time_span_start. The version number shall be incremented by 1 modulo 32 when any field in the NRT-IT instance changes.

current_next_indicator—This 1-bit indicator shall always be set to '1' for NRT-IT sections; the NRT-IT sent is always currently applicable.

protocol_version—This 8-bit unsigned integer field shall be set to zero. The function of protocol_version is to allow, in the future, this table type to carry parameters that may be structured differently than those defined in the current protocol. At present, the only valid value for protocol_version is zero. Non-zero values of protocol_version may be used by a future version of this standard to indicate structurally different tables.

time_span_start—This 32-bit unsigned integer shall represent the start of the time span covered by this instance of the NRT-IT, expressed as the number of GPS seconds since 00:00:00 UTC, Jan. 6, 1980. The time of day of time_span_ start shall be aligned to minute 00 of the hour. The value zero for time_span_start shall indicate the time period covered by his NRT-IT instance began in the indefinite past. The value of time_span_start shall be the same for each section of a multi-sectioned NRT-IT instance. The values of time_span_start and time_span_length shall be set such that the specified time span does not overlap with any other NRT-IT instance in this IP subnet.

time_span_length—This 11-bit unsigned integer field in the range 0 to 1440 shall indicate the number of minutes, starting at the time indicated by time_span_start, covered by this instance of the NRT-IT. Once established, the value of time_span_length for a given value of time_span_start shall not change. A value of time_span_length of zero shall mean this NRT-IT instance covers all time starting at time_span_start into the indefinite future. If the value of time_span_start is zero, time_span_length shall have no meaning. The value of time_span_length shall be the same for each section of a multi-sectioned NRT-IT instance. The values of time_span_start and time_span length shall be set such that the specified time span does not overlap with any other NRT-IT instance in this IP subnet.

num_items_in_section—This 8-bit unsigned integer field shall indicate the number of content items described in this NRT-IT section.

content_id—This 16-bit unsigned integer field in the range 0x0001 to 0xFFFF shall specify the identification number of the content described. Value 0x0000 shall not be used. The content_id performs two linkage functions: it links metadata in the NRT-IT to one or more files in the FLUTE FDT associated with this NRT service; it also forms the TF_id (identifier for Text Fragment in Text Fragment Table). The value of the content_id field shall correspond to the value of one of the Content-Linkage element instances in the File element in the File Description Table instance defined in RFC 3926 as extended in Sec 1.5 for each file which is part of the content item. For a particular virtual channel, the value of content_id shall uniquely identify each of the items of content scheduled to be available for download during the interval covered by a given NRT-IT instance. (Note: the scope can be expanded to extend to all scheduled content.)

updates_available—This Boolean flag shall specify, when set to '1,' that the referenced content item(s) will be updated periodically: for content items delivered in FLUTE sessions, receiving devices are expected to monitor for changes the TOI associated with each file associated with the given value of content_id. When the updates_available flag is set to '0', updates are not expected to be provided for the associated content item(s), and receivers are not expected to look for them.

TF_available—This Boolean flag shall specify, when set to '1' that a Text Fragment is present in a Text Fragment Table in the service signaling channel. When the flag is set to '0,' no Text Fragment is included in the service signaling channel for this content item.

low_latency—This Boolean flag shall specify, when set to '1,' that the content is available within the current digital transport with a low enough latency that its retrieval should be attempted while the user waits. When the flag is set to '0,' retrieval latency is longer and the user interface should suggest to the user to return later for viewing.

content_length_included—This Boolean flag shall indicate, when set to '1,' that the content_length field is present in this iteration of the "for" loop. Setting this flag to '0' shall indicate the content_length field is not present in this iteration of the "for" loop.

playback_length_in_seconds—This 20-bit unsigned integer quantity shall specify the duration of playback of the content, in seconds. For content consisting only of text and/or still images, the value zero shall be used. For content that includes audio or audio/video content, the playback_length_in_seconds shall indicate the playback length of the audio or audio/video content.

content_length—When present, this 40-bit unsigned integer quantity shall represent the total size in bytes of the content item or items. This item is used by the receiving device to determine if enough memory is available to store it before downloading is attempted. The content_length field shall be present when content_length_included is set to '1' and absent otherwise. When content_length is not present in a given iteration of the "for" loop, the length of the content described in that iteration shall be the value specified in the default_content_length field in the NRT_service_info_descriptor( ), if present in the SMT.

playback_delay_included—This Boolean flag shall indicate, when set to '1,' that the playback_delay field is present in this iteration of the "for" loop. Setting this flag to '0' shall indicate the playback_delay field is not present in this iteration of the "for" loop.

duration—This 12-bit unsigned integer field in the range 1 to 2880 shall specify the expected cycle time, in minutes, of the carousel containing the referenced content item. A receiver is expected to use the duration parameter to determine the amount of time needed to capture the referenced content.

playback_delay—A 20-bit unsigned integer count of the number of seconds following reception of the first byte of the associated content the receiver shall wait before playback may start, while buffering the incoming stream. A value of zero shall indicate playback may commence immediately. When playback_delay is not provided, the receiver is expected to retrieve the complete file or file set prior to playback.

expiration_included—This Boolean flag shall indicate, when set to '1,' that the expiration field is present in this iteration of the "for" loop. Setting this flag to '0' shall indicate the expiration field is not present in this iteration of the "for" loop.

expiration—This 32-bit unsigned integer shall represent the expiration time of the content, expressed as the number of GPS seconds since 00:00:00 UTC, Jan. 6, 1980. Following expiration, the content should be deleted from memory. If an expiration time is not specified, receivers are expected to use methods of their own choosing to manage memory resources.

content_name_length—This 8-bit unsigned integer field shall specify the length (in bytes) of the content_name_text( ).

content_name_text( )—This field shall specify the content item title in the format of a multiple string structure (see A/65 Section 6.10).

content_descriptors_length—This 12-bit unsigned integer field shall indicate the total length (in bytes) of the content item descriptor list that follows.

content_descriptor( )—One or more descriptors may be included in the NRT-IT in an iteration of the content item "for" loop. Table 2 lists some content-level descriptors usable in the NRT-IT. Normative requirements and usage rules are given in the referenced sections, where appropriate.

TABLE 2

Content-Level Descriptors in the Non-Real-Time Information Table (Informative)

| Descriptor Name | Descriptor Tag | Reference and Description |
| --- | --- | --- |
| Time slot descriptor | TBD | Sec. 1.4. Provides the time(s) the associated content is scheduled to be made available in the digital transport. Required. |
| Media type descriptor | TBD | Sec. TBD Lists the Media types of those formats and encodings for which receiver support is essential for a meaningful presentation of the service. |
| Internet location descriptor | TBD | Sec. 1.5. Provides optional URLs for Internet-based access to the content. |
| ISO-639 language descriptor | 0x0A | ISO/IEC 13818-1 Sec. 2.6.18. If present, indicates the language of audio and/or textual components of the service. |
| Content labeling descriptor | 0x24 | A/57 and ISO/IEC 13818-1 Sec. 2.6.56. Associates the content with content labeling metadata. Use of ISAN is strongly recommended for content containing audio/video components. |
| MPEG-2 AAC audio descriptor | 0x2B | ISO/IEC 13818-1 Sec. 2.6.68. Provides information pertaining to the audio portion of the content. |
| Caption service descriptor | 0x86 | A/65 Sec. 6.9.2. Provides caption service information pertinent to the content object(s). |
| Content advisory descriptor | 0x87 | A/65 Sec. 6.9.3. Provides content advisory information pertinent to the content object(s). |
| Genre descriptor | 0xAB | A/65, Sec. 6.9.13. Indicates the Genre category associated with the content object(s). |
| ATSC private information descriptor | 0xAD | A/53 Part 3 Sec. 6.8.4. Usable for private information associated with the content object(s). |
| M/H component descriptor | 0xBC | A/153 Part 3 Sec. 7.8.1. The following component types are applicable for NRT-IT use: <br> component type / Meaning <br> 35 / H.264/AVC video stream <br> 36 / SVC enhancement layer stream <br> 37 / HE AAC v2 audio stream <br> 39 / STKM stream component <br> 40 / LTKM stream component | descriptors_length—A 10-bit unsigned integer number that indicates the number of bytes of descriptors (if any) to follow.

descriptor( )—A data structure in standard descriptor format (tag, length, data) that provides information about the NRT content described in this NRT_information_table_section( ). No descriptors of this type are currently defined.

1.2 Icon Descriptor

The Icon Descriptor provides the media format and a reference to a file in the service's FLUTE session of an image file that can be used as a icon. The bit stream syntax of the Icon Descriptor shall be as shown in Table 3.

TABLE 3

Bit Stream Syntax for the Icon Descriptor

| Syntax | No. of Bits | Format |
| --- | --- | --- |
| icon_descriptor( ) { | | |
|   descriptor_tag | 8 | 0xTBD |
|   descriptor_length | 8 | uimsbf |
|   reserved | 4 | '1111' |
|   icon_media_type | 4 | uimsbf |
|   icon_content_id | 16 | uimsbf |
|   for (i=0; i<N; i++) { | | |
|     reserved | 8 | bslbf |
|   } | | |
| } | | | descriptor_tag—This 8-bit unsigned integer shall have the value 0xTBD, identifying this descriptor as a icon_descriptor( ).

descriptor_length—This 8-bit unsigned integer shall specify the length (in bytes) immediately following this field up to the end of this descriptor.

icon_media_type—This 4-bit unsigned integer shall specify the image media type of the icon encoded as in Table 4.

TABLE 4

Icon Media Type Encoding

| icon_media_type | Meaning |
| --- | --- |
| 0x0 | Reserved |
| 0x01 | image/jpeg |
| 0x02 | image/png |
| 0x03-0x0F | Reserved for future ATSC use | icon_content_id—This 16-bit unsigned integer field shall reference the content-id attribute of a file in the FLUTE FDT associated with either the content or the service.

1.3 NRT Service Information Descriptor

The NRT Service Information Descriptor provides additional service-level metadata pertaining to NRT services. The bit stream syntax of the NRT Service Information Descriptor shall be as shown in Table 5.

TABLE 5

Bit Stream Syntax for the NRT Service Information Descriptor

| Syntax | No. of Bits | Format |
|---|---|---|
| NRT_service_info_descriptor ( ) { | | |
|   descriptor_tag | 8 | 0xTBD |
|   descriptor_length | 8 | uimsbf |
|   storage_reservation | 24 | uimsbf |
|   subscribe | 1 | bslbf |
|   default_content_length_present | 1 | bslbf |
|   reserved | 6 | '111111' |
|   if (default_content_length_present==1) { | | |
|     default_content_length | 32 | uimsbf |
|   } | | |
|   for (i=0; i<N; i++) { | | |
|     reserved | 8 | bslbf |
|   } | | |
| } | | | descriptor_tag—This 8-bit unsigned integer shall have the value 0xTBD, identifying this descriptor as a NRT_service_info_descriptor( ).

descriptor_length—This 8-bit unsigned integer shall specify the length (in bytes) immediately following this field up to the end of this descriptor.

storage_reservation—This 24-bit unsigned integer field shall indicate the recommended minimum number of kilobytes (one kilobyte equals 1024 bytes) of storage required in the receiver for successful handling of content delivered within this NRT service.

subscribe—This Boolean flag shall specify, when set to '1' that the option to subscribe to the service should be offered to the user. When the flag is set to '0,' no recommendation is given regarding the option to subscribe. The receiver is expected to pre-load content for those services for which the user has expressed an ongoing interest by agreeing to subscribe.

default_content_length_present—This Boolean flag shall indicate, when set to '1' that the default_content_length field is present in the descriptor. When the flag is set to '0' the default_content_length shall not be present.

default_content_length—This 32-bit unsigned integer field shall indicate the length of any piece of content in the "for" loop to follow in which the corresponding content_length field is not present (content_length_included is set to '0').

1.4 Time Slot Descriptor

The Time Slot Descriptor encodes a time interval or set of repeating time intervals. One or more time_slot_descriptor( )s shall be present in each content-level descriptor loop in the NRT_information_table_section( ). The bit stream syntax of the Time Slot Descriptor shall be as shown in Table 6.

TABLE 6

Bit Stream Syntax for the Time Slot Descriptor

| Syntax | No. of Bits | Format |
|---|---|---|
| time_slot_descriptor( ) { | | |
|   descriptor_tag | 8 | 0xTBD |
|   descriptor_length | 8 | uimsbf |
|   time_slot_start | 32 | uimsbf |
|   repeating | 1 | bslbf |
|   time_slot_length | 15 | uimsbf |
|   if (repeating=='1') { | | |
|     repeat_period | 16 | uimsbf |
|     slot_count | 8 | uimsbf |
|   } | | |

TABLE 6-continued

Bit Stream Syntax for the Time Slot Descriptor

| Syntax | No. of Bits | Format |
|---|---|---|
|   for (i=0; i<N; i++) { | | |
|     reserved | 8 | bslbf |
|   } | | |
| } | | | descriptor_tag—This 8-bit unsigned integer shall have the value 0xTBD, identifying this descriptor as a time_slot_descriptor( ).

descriptor_length—This 8-bit unsigned integer shall specify the length (in bytes) immediately following this field up to the end of this descriptor.

time_slot_start—This 32-bit unsigned integer shall represent the start time of the time slot(s) as the number of GPS seconds since 00:00:00 UTC, Jan. 6, 1980. A value of zero for time_slot_start shall indicate the time slot began in the indefinite past.

repeating—A 1-bit Boolean flag that shall indicate, when set, that the repeat_interval and repeat_count fields are present in the descriptor, e.g. a repeating time slot is specified. A value of '0' shall indicate the repeat_period and slot_count fields are not present. If the value of time_slot_start is zero, the repeating flag shall be set to '0.' time_slot_length—This 15-bit unsigned integer shall represent length of the time slot in minutes.

repeat_period—This 16-bit unsigned integer shall represent the period of repetition of the time slot.

The relationships between time_slot_start, time_slot_length, and repeat_period are diagrammed in FIG. 4. In the example, the time slot appears three times.

slot_count—This 8-bit unsigned integer in the range 0 to 255 shall indicate the number of times the time slot will occur, starting at the time slot beginning at time_slot_start. A value of zero for slot_count shall indicate the repetition shall be assumed to continue indefinitely.

1.5 Internet Location Descriptor

The Internet Location Descriptor provides one or more Uniform Reference Locators (URLs) referencing content items that may be retrieved via the Internet.

The bit stream syntax for the Internet Location Descriptor shall be as shown in Table 7.

TABLE 7

Bit Stream Syntax for the Internet Location Descriptor

| Syntax | No. of Bits | Format |
|---|---|---|
| internet_location_descriptor( ) { | | |
|   descriptor_tag | 8 | 0xTBD |
|   descriptor_length | 8 | uimsbf |
|   reserved | 3 | '111' |
|   URL_count | 5 | uimsbf |
|   for (i=0; i<URL_count; i++) { | | |
|     URL_length | 8 | uimsbf |
|     URL( ) | var | |
|   } | | |
|   for (j=0; j< N; j++) { | | |
|     Reserved | 8 | bslbf |
|   } | | |
| } | | | descriptor_tag—This 8-bit unsigned integer shall have the value 0xTBD, identifying this descriptor as an internet_location_descriptor( ).

descriptor_length—This 8-bit unsigned integer shall specify the length (in bytes) immediately following this field up to the end of this descriptor.

URL_count—This 5-bit unsigned integer field shall indicate the number of URL references (URL_length/URL( ) pairs) in this instance of the descriptor.

URL_length—This 8-bit unsigned integer shall specify the length in bytes of the URL to follow.

URL( )—This field is a character string which represents the Uniform Reference Locator per RFC 3986, of a piece of referenced content. The URI scheme shall be either http: or https:.

1.6 NRT Service Descriptor

The NRT Service Descriptor is used to indicate the presence of NRT components within a service, and indicates the usage/consumption model for a non-real-time service.

Whenever a service contains NRT components, one instance of an NRT Service Descriptor shall be included in the SMT as an MH_service_level_descriptor( ).

The bit stream syntax for the NRT Service Descriptor shall be as shown in TABLE 8.

TABLE 8

Bit Stream Syntax for the NRT Service Descriptor

| Syntax | No. of Bits | Format |
|---|---|---|
| NRT_service_descriptor( ) { | | |
| descriptor_tag | 8 | 0xTBD |
| descriptor_length | 8 | uimsbf |
| Reserved | 3 | '11' |
| NRT_service_category | 6 | uimsbf |
| for (j=0; j< N; j++) { | | |
| Reserved | 8 | bslbf |
| } | | |
| } | | | descriptor_tag—This 8-bit unsigned integer shall have the value 0xTBD, identifying this descriptor as an NRT_service_descriptor( ).

descriptor_length—This 8-bit unsigned integer shall specify the length (in bytes) immediately following this field up to the end of this descriptor.

NRT_service_category—This 6-bit unsigned integer shall specify the consumption model for the NRT service associated with the descriptor. A variety of user experiences are possible for NRT services. NRT Service Categories shall be as defined in TABLE 9 below. Note: other types of NRT services may be defined in future ATSC standards.

TABLE 9

NRT Service Category

| NRT_service_category | Meaning |
|---|---|
| 0x00 | Forbidden. |
| 0x01 | Browse & Download - The NRT service describes content that can be selected for later download. |
| 0x02 | Portal - The NRT service provides an experience similar to a web browser access. Files needed to support text/graphics rendering are available in the associated FLUTE session. |
| 0x03 | Push - The NRT service offers subscription-based content. Receivers are expected to offer the user a choice whether or not to subscribe to the service. For subscribed services, the receiver caches and service-related content and updates files as new versions are made available. When the user returns |

TABLE 9-continued

NRT Service Category

| NRT_service_category | Meaning |
|---|---|
| | to a subscribed Push service, content that had been pre-loaded is displayed. |
| 0x04-0x3F | Reserved for future ATSC use. |

1.7 Text Fragment Table (TFT)

The Text Fragment Table (TFT) contains text fragments used to provide detailed descriptions of content items or services. The TFT carries a data structure supporting multiple languages and thus, it may represent descriptions in several different languages (each string corresponding to one language).

The Text Fragment Table is carried in private sections with table_id value TBD and obeys the syntax and semantics given below. Each description is distinguished by its unique 32-bit TFT_id.

The TFT section shall be carried in IP packets within the Service Signaling Channel, which has been assigned by IANA to multicast IP address 224.0.23.60, port 4937.

The following constraints apply to the IP packets carrying the TFT sections.

TBD

Unless otherwise defined below, identically-named fields in the text_fragment_table_section( ) shall be as defined as in the MH_service_signaling_table_section( ) defined in A/153 Part 3, Sec. 7,1. The bit stream syntax for the Text Fragment Table shall be as shown in TABLE 10.

TABLE 10

Bit Stream Syntax for the Text Fragment Table

| Syntax | No. Bits | Format |
|---|---|---|
| text_fragment_table_section( ) { | | |
| table_id | 8 | 0xTBD |
| section_syntax_indicator | 1 | '1' |
| private_indicator | 1 | '1' |
| Reserved | 2 | '11' |
| section_length | 12 | uimsbf |
| service_id | 16 | uimsbf |
| Reserved | 2 | '11' |
| TFT_version_number | 5 | uimsbf |
| current_next_indicator | 1 | '1' |
| section_number | 8 | uimsbf |
| last_section_number | 8 | uimsbf |
| protocol_version | 8 | uimsbf |
| time_span_start | 32 | uimsbf |
| Reserved | 5 | '11111' |
| time_span_length | 11 | uimsbf |
| num_fragments_in_section | 8 | uimsbf |
| for (j=0; j< num_fragments_in_section; j++) { | | |
| TF_id | 16 | uimsbf |
| text_length | 16 | uimsbf |
| text_fragment( ) | | var |
| } | | |
| } | | | table_id—This 8-bit field shall be set to 0xTBD to identify this table section as belonging to the Text Fragment Table.

section_length—This 12-bit unsigned integer field shall specifies the number of remaining bytes this table section immediately following this field. The value in this field shall not exceed 4093 (0xFFD).

service_id—This 16-bit field shall specify the service_id associated with the service offering text fragments transported in this table section.

TF_version_number—This 5-bit field shall indicate the version number of this TFT instance, where TFT instance is defined as the set of one or more text_fragment_table_section( ) having common values for service_id, current_next_indicator, protocol_version, and time_span_start. The version number shall be incremented by 1 modulo 32 when any field in the TFT instance changes.

current_next_indicator—This 1-bit indicator shall always be set to '1' for TFT sections; the TFT sent is always currently applicable.

protocol_version—This 8-bit unsigned integer field shall be set to zero. The function of protocol_version is to allow, in the future, this table type to carry parameters that may be structured differently than those defined in the current protocol. At present, the only valid value for protocol_version is zero. Non-zero values of protocol_version may be used by a future version of this standard to indicate structurally different tables.

time_span_start—This 32-bit unsigned integer shall represent the start of the time span covered by this instance of the TFT, expressed as the number of GPS seconds since 00:00:00 UTC, Jan. 6, 1980. The time of day of time_span_start shall be aligned to minute 00 of the hour. The value zero for time_span_start shall indicate the time period covered by his TFT instance began in the indefinite past. The value of time_span_start shall be the same for each section of a multi-sectioned TFT instance. The values of time_span_start and time_span length shall be set such that the specified time span does not overlap with any other TFT instance in this IP subnet. For Service Type 0x08 (NRT Services), time_span_start and time_span_length in a given TFT instance shall exactly align with equal values in the corresponding NRT-IT instance.

time_span_length—This 11-bit unsigned integer field in the range 0 to 1440 shall indicate the number of minutes, starting at the time indicated by time_span_start, covered by this instance of the TFT. Once established, the value of time_span length for a given value of time_span_start shall not change. A value of time_span_length of zero shall mean this TFT instance covers all time starting at time_span_start into the indefinite future. If the value of time_span_start is zero, time_span_length shall have no meaning. The value of time_span_length shall be the same for each section of a multi-sectioned TFT instance. The values of time_span_start and time_span_length shall be set such that the specified time span does not overlap with any other TFT instance in this IP subnet. For Service Type 0x08 (NRT Services), time_span_start and time_span_length in a given TFT instance shall exactly align with equal values in the corresponding NRT-IT instance.

num_fragments_in_section—This 8-bit unsigned integer field shall indicate the number of text fragments described in this TFT section.

TF_id—This 16-bit unsigned integer shall uniquely identify a given text fragment in the context of the service identified by service_id. For Service Type 0x08 (NRT Services), this identifier shall be equal to content_id. The TF_id value 0x0000 shall indicate the text fragment describes the service identified by service_id.

text_length—This 16-bit unsigned integer field shall indicate the length in bytes of the text_fragment( ) field to follow.

text_fragment( )—The text fragment formatted as an ATSC_MH_multiple_string_structure( ) as defined in A/153 Part 3, Sec, 7.9.

What is claimed is:

1. A digital television receiver that receives non-real time (NRT) content, comprising in combination:

a radio frequency tuner that receives a radio frequency modulated channel containing a transport stream over a tuned channel and demodulates the channel to produce an output transport stream;

the output transport stream containing an Internet Protocol (IP) stream of packets containing non-real time content, a FLUTE file description table (FDT) and NRT metadata;

an electronic storage medium;

a demultiplexer that demultiplexes the IP stream of packets to produce:
 NRT content that is stored in the electronic storage medium,
 the FLUTE FDT, and
 NRT metadata;

an FDT parser that parses the FDT to produce NRT file metadata from the FLUTE FDT; and an NRT metadata parser that produces NRT service metadata; NRT content description text and NRT content metadata;

where the NRT service metadata is stored in a Service Map Table (SMT), the NRT content description text is stored in a Text Fragment Table (TFT), the NRT content metadata is stored in an NRT information table (NRT-IT), and wherein the output transport stream further comprises a virtual channel table (VCT), and wherein the VCT contains a service type code indicative of a virtual channel corresponding to NRT content;

and where the NRT-IT table has a content ID that indexes table entries in the FLUTE FDT.

2. The NRT receiver according to claim 1, wherein a service signaling channel contains the NRT metadata.

3. The NRT receiver according to claim 1, wherein the NRT service metadata is received in a Service Map Table.

4. The NRT receiver according to claim 1, wherein the NRT content description text is received in a Text Fragment Table (TFT).

5. The NRT receiver according to claim 1, wherein the NRT content metadata is received in an NRT information table (NRT-IT).

6. The NRT receiver according to claim 1, wherein the SMT signals an IP destination address and Port number that points to the FLUTE FDT, and wherein the SMT has a service ID (SID) that indexes a table entry pointing at a matching service ID in the NRT-IT.

7. The NRT receiver according to claim 1, wherein the NRT-IT table further includes entries in the TFT.

8. The NRT receiver according to claim 1, wherein the NRT-IT table includes a Playback Delay parameter that indicates an amount of time from the recovery of the first byte of the file the receiver should wait prior to beginning playback of the content.

9. The NRT receiver according to claim 1, wherein the NRT-IT table includes a flag indicating whether or not the NRT file can be extracted from the broadcast stream with lower-latency or whether the receiver should prompt the user to return to view it at a later time due to longer latency, wherein lower and longer are measured with respect to one another.

10. The NRT receiver according to claim 1, wherein the NRT-IT table points to a table that points to a graphical icon representation of the NRT service or content item.

11. The NRT receiver according to claim 1, wherein NRT service metadata is stored in a Service Map Table.

12. The NRT receiver according to claim 1, wherein the content metadata comprises an indication that the identified content may be retrieved from an Internet-based server, and a Uniform Reference Locator (URL) that may be used to effect said retrieval.

13. A digital television receiver that receives non-real time (NRT) content, comprising in combination:
an Internet protocol (IP) receiver that receives a stream of IP packets and selects an IP subnet containing a packet stream selected as an output packet stream;
the output packet stream containing non-real time content, a FLUTE file description table (FDT) and NRT metadata;
an electronic storage medium;
a demultiplexer that demultiplexes the IP packet stream to produce:
NRT content that is stored in the electronic storage medium,
the FLUTE FDT, and
NRT metadata;
an FDT parser that parses the FDT to produce NRT file metadata from the FLUTE FDT; and
an NRT metadata parser that produces NRT service metadata and NRT content metadata;
where the NRT metadata is stored in an NRT-IT table that has a content ID that indexes table entries in the FLUTE FDT.

14. The NRT receiver according to claim 13, wherein a Service Signaling Channel (SSC) contains the NRT metadata.

15. The NRT receiver according to claim 13, wherein the NRT service metadata is received in a Service Map Table.

16. The NRT receiver according to claim 13, wherein the NRT content description text is received in a Text Fragment Table (TFT).

17. The NRT receiver according to claim 13, wherein the NRT content metadata is received in an NRT information table (NRT-IT).

18. The NRT receiver according to claim 13, wherein the output transport stream further comprises a virtual channel table (VCT), and wherein the VCT contains a service type code indicative of a virtual channel corresponding to NRT content.

19. The NRT receiver according to claim 13, wherein the NRT service metadata is received in a Service Map Table (SMT), the NRT content description text is received in a Text Fragment Table (TFT), the NRT content metadata is received in an NRT information table (NRT-IT), and wherein the output transport stream further comprises a virtual channel table (VCT), and wherein the VCT contains a service type code indicative of a virtual channel corresponding to NRT content.

20. The NRT receiver according to claim 19, wherein the SMT has an IP destination address and Port number that points to the FLUTE FDT, and wherein the SMT has a service ID (SID) that indexes a table entry pointing at a service ID in the NRT-IT.

21. The NRT receiver according to claim 13, wherein the NRT-IT table further includes entries in the TFT.

22. The NRT receiver according to claim 13, wherein the NRT-IT table includes a Playback Delay parameter that indicates an amount of time from the recovery of the first byte of the file the receiver should wait prior to beginning playback of the content.

23. The NRT receiver according to claim 13, wherein the NRT-IT table includes a flag indicating whether or not the NRT file can be extracted from the broadcast stream with lower-latency or whether the receiver should prompt the user to return to view it at a later time due to longer latency, wherein lower and longer are measured with respect to one another.

24. The NRT receiver according to claim 13, wherein the NRT-IT table points to a table that points to a graphical icon representation of the NRT service or content item.

25. The NRT receiver according to claim 13, wherein the NRT service metadata is stored in a Service Map Table.

26. The NRT receiver according to claim 13, wherein the NRT content description text is stored in a Text Fragment Table (TFT).

27. The NRT receiver according to claim 13, wherein the content metadata comprises an indication that the identified content may be retrieved from an Internet-based server, and a Uniform Reference Locator (URL) that may be used to effect said retrieval.

28. A digital television receiver that receives non-real time (NRT) content, comprising in combination:
a receiver device that receives a signal and produces an output transport stream, the output transport stream containing an Internet Protocol (IP) stream of packets containing non-real time content, a FLUTE file description table (FDT) and NRT metadata;
an electronic storage medium;
a demultiplexer that demultiplexes the IP stream of packets to produce:
NRT content that is stored in the electronic storage medium,
the FLUTE FDT, and
NRT metadata;
an FDT parser that parses the FDT to produce NRT file metadata from the FLUTE FDT; and
an NRT metadata parser that produces NRT service metadata; NRT content description text and NRT Content Metadata;
where the NRT service metadata is stored in a Service Map Table (SMT), the NRT content description text is stored in a Text Fragment Table (TFT), the NRT content metadata is stored in an NRT information table (NRT-IT), and wherein the output transport stream further comprises a virtual channel table (VCT), and wherein the VCT contains a service type code indicative of a virtual channel corresponding to NRT content;
and where the NRT-IT table has a content ID that indexes table entries in the FLUTE FDT.

* * * * *